Patented Sept. 30, 1941

2,257,290

UNITED STATES PATENT OFFICE 2,257,290

ORGANIC SULPHUR COMPOUND AND COMPOSITION THEREOF

Vanderveer Voorhees, Hammond, Ind., assignor to Standard Oil Company, Chicago, Ill., a corporation of Indiana No Drawing. Application June 11, 1938, Serial No. 213,187

11 Claims. (Cl. 260—125)

This invention relates to a new article of manufacture and the method of preparing the same.

The new article of manufacture is prepared by reacting a polysulphide with an olefin derived compound in the presence of a mercaptan. The olefin derived compound is preferably one containing the group $C_nH_{2n}$ combined with the equivalent of two monovalent negative radicals, such as the halogen derivatives of the homologs of the ethylene series, for example, amylene dichloride, butylene dichloride, propylene dichloride, ethylene dichloride, ethylene dibromide, propylene dibromide, methylene di-iodide, and methylene dichloride. Other olefinic compounds, such as the olefin sulphates, the olefin acetates and the olefin oxides, e. g. ethylene oxide may also be used, although the alkylene dihalides are preferred.

The polysulphides employed in the reaction are preferably the polysulphides of the alkali metals, the alkaline earth metals and ammonia which are hereinafter referred to as the "alkali polysulphides."

Although mercaptans in general may be used in the reaction I prefer to employ the alkyl mercaptans and preferably those alkyl mercaptans having more than three carbon atoms in the alkyl radical. Examples of the alkyl mercaptans which I prefer to use are butyl mercaptans, amyl mercaptans, hexyl mercaptans, octyl mercaptans, cetyl mercaptans, lauryl mercaptans and the like. I may also use cyclic compounds such as cyclohexyl mercaptan.

The product of the present invention is obtained by reacting from about 35% to about 50% of the polysulphide with from about 25% to about 35% of an olefin dihalide in the presence of from about 15% to about 50% of an alkyl mercaptan at a temperature of from about 140° F. to about 190° F. and even as high as about 375° F. if the reaction is carried out in a pressure vessel with a reaction time of from about 1 to about 5 hours. Any excess of mercaptan may be recovered by suitable means.

The method of carrying out the invention is exemplified by the following illustrations which are intended merely to illustrate the invention and not in any way to limit the scope thereof.

Example I

About 54 grams of sodium tetrasulphide were dissolved in sufficient water to obtain a solution having substantially the same specific gravity as a mixture of about 37 grams of ethylene dichloride and about 17 grams of amyl mercaptan. The mixture of polysulphide solution, mercaptan and ethylene dichloride was digested at a temperature of about 160° F. for about 2 hours in a vessel having a reflux condenser. The reaction mass was then stripped with $CO_2$ at about 300–400° F. and a very thick liquid which was not very soluble in oil was obtained.

Example II

About 38 grams of sodium tetrasulphide were dissolved in sufficient water to bring the specific gravity of the solution substantially to that of a mixture of about 26 grams of ethylene dichloride and 36 grams of amyl mercaptan. The mixture was then heated together in a flask provided with a reflux condenser at a temperature of about 160° F. for about 6 hours. The product obtained from this reaction after being stripped with $CO_2$ at a temperature of about 300° F. to about 400° F. was an oily substance of medium viscosity and soluble in oil. The product had a sulphur content of about 38%.

Example III

The reaction mixture described in Example II was heated at a temperature of about 160° F. under a reflux condenser for about 5 hours. The product obtained was an oily substance of medium viscosity which was soluble in oil. This product also had a sulphur content of about 38%.

Example IV

A mixture comprising a water solution of about 69 grams of sodium penta sulphide, about 37 grams of ethylene dichloride and about 50 grams of amyl mercaptans was heated at a temperature of about 160° F. under a reflux condenser for about 4 hours. As in the previous examples the polysulphide was dissolved in sufficient water to obtain a solution approaching the same specific gravity as the mixture of ethylene dichloride and mercaptan. The product obtained after stripping as in the foregoing examples, was an oily substance of medium viscosity and soluble to the extent of about 3% in a mineral oil. This product had a sulphur content of about 55%.

I have discovered that the products obtained by the above described reactions are valuable addition agents in lubricants, electrical insulating oils, Diesel fuels and other mineral oil products, including greases and wax products. For example, 3% of the reaction product obtained in Example II raised the cetane number of a regular high speed Diesel fuel from 55 to 69. Three percent of the reaction product obtained in Example III increased the cetane number of a Diesel fuel from 37 to 46 while 2% raised the cetane number from 37 to 44. Upon the addition of 3% of the reaction product obtained in Example IV the cetane number of a Diesel fuel was also raised from 37 to 46.

In addition to the effectiveness of these reaction products to improve Diesel fuels, I have discovered that the addition of from about 1% to about 10% of the reaction products to lubricants is effective in increasing the extreme pressure characteristics of such lubricants. For example an S. A. E. No. 10 oil containing 5% of the reaction product obtained in Example IV passed the S. A. E. extreme pressure test at 600 pounds and 1000 R. P. M. The oil alone failed at 75 pounds and 1000 R. P. M. Relatively small amounts, for example 0.001 to 0.05% of these reaction products are also effective in inhibiting the oxidation of mineral oil products.

While I have described my invention in connection with certain preferred embodiments thereof, I do not intend to limit the invention thereto except insofar as the same is defined by the appended claims which should be interpreted as broadly as the prior art will permit.

I claim:

1. The method of preparing an organic sulphur compound comprising reacting an alkali polysulphide with a mixture of a mercaptan and a compound of the formula $C_nH_{2n}X_y$ in which $n$ is a whole number, X is a negative radical and $y$ is an integer less than 3.

2. The method of preparing an organic sulphur compound as described in claim 1 in which X is a halogen and $y$ is 2.

3. The method of preparing an organic sulphur compound as described in claim 1 in which the mercaptan is an alkyl mercaptan having at least 3 carbon atoms in the alkyl radical.

4. The method of preparing an organic sulphur compound comprising reacting a sodium polysulphide with a mixture of an alkyl mercaptan and an alkylene dihalide.

5. The method of preparing an organic sulphur compound as described in claim 4 in which the sodium polysulphide is sodium tetrasulphide.

6. The method of preparing an organic sulphur compound as described in claim 4 in which the sodium polysulphide is sodium penta sulphide.

7. The method of preparing an organic sulphur compound comprising reacting sodium tetrasulphide with a mixture of amyl mercaptan and ethylene dichloride.

8. An organic sulphur compound obtained by the method described in claim 1.

9. An organic sulphur compound obtained by the method described in claim 7.

10. As a new composition of matter an organic sulphur compound obtained by reacting an alkali polysulphide with a mixture of a mercaptan and a compound of the formula $C_nH_{2n}X_y$ in which $n$ is a whole number, X is a negative radical and $y$ is an integer less than 3.

11. As a new composition of matter an organic sulphur compound obtained by reacting sodium polysulphide with a mixture of an alkyl mercaptan and an alkylene dihalide.

VANDERVEER VOORHEES.